Jan. 28, 1969  O. C. BLOMGREN, JR  3,423,998
FUEL CONSUMPTION RATE MEASUREMENT FOR DIESEL ENGINES
Filed Feb. 16, 1967  Sheet 2 of 5
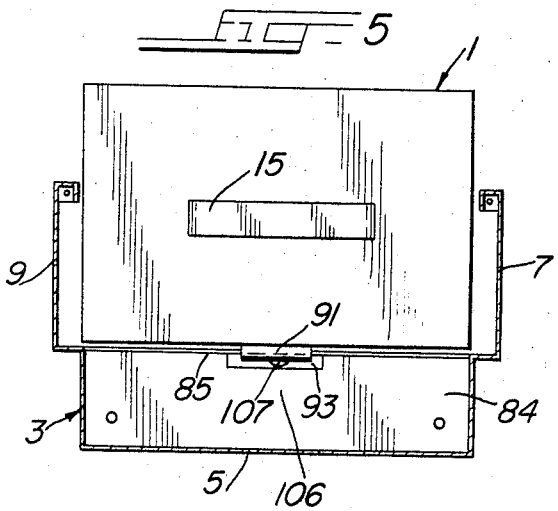
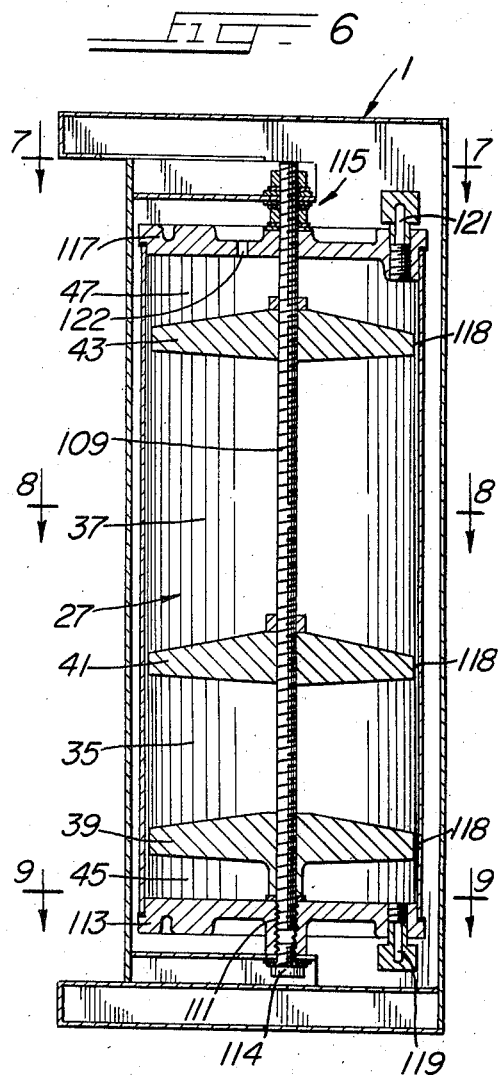
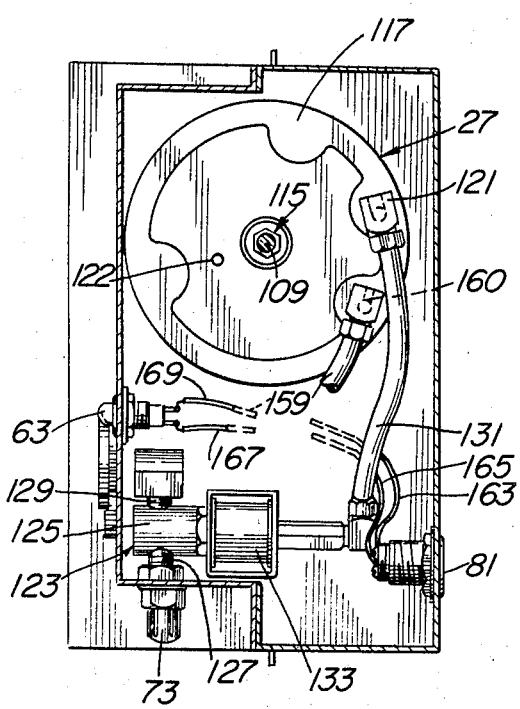
INVENTOR.
OSCAR C. BLOMGREN, JR.
BY Jan. 28, 1969     O. C. BLOMGREN, JR     3,423,998
FUEL CONSUMPTION RATE MEASUREMENT FOR DIESEL ENGINES
Filed Feb. 16, 1967                                Sheet 3 of 5
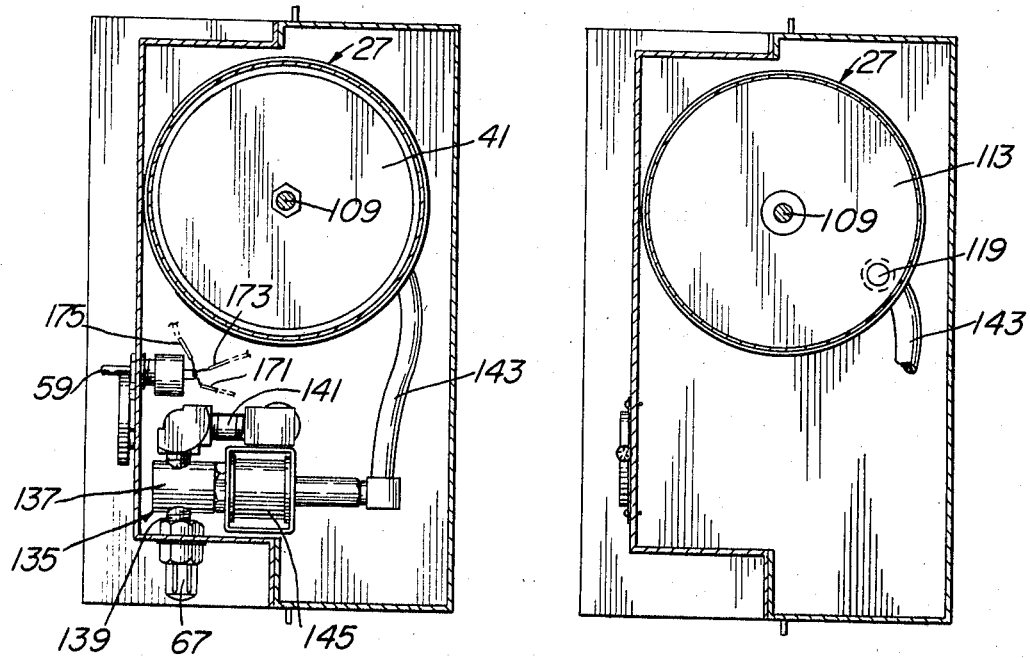
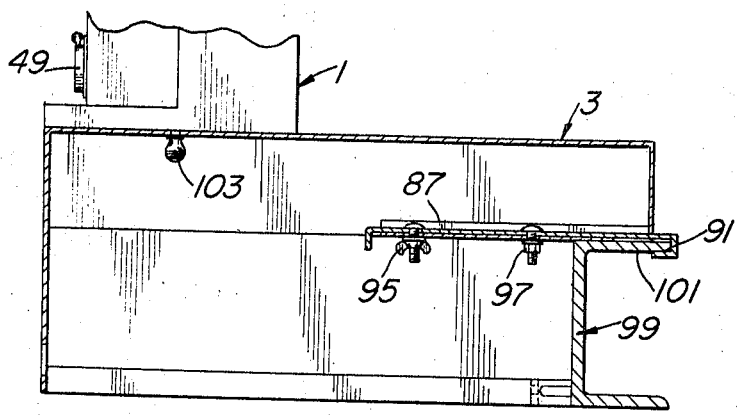
INVENTOR.
OSCAR C. BLOMGREN, JR.
BY

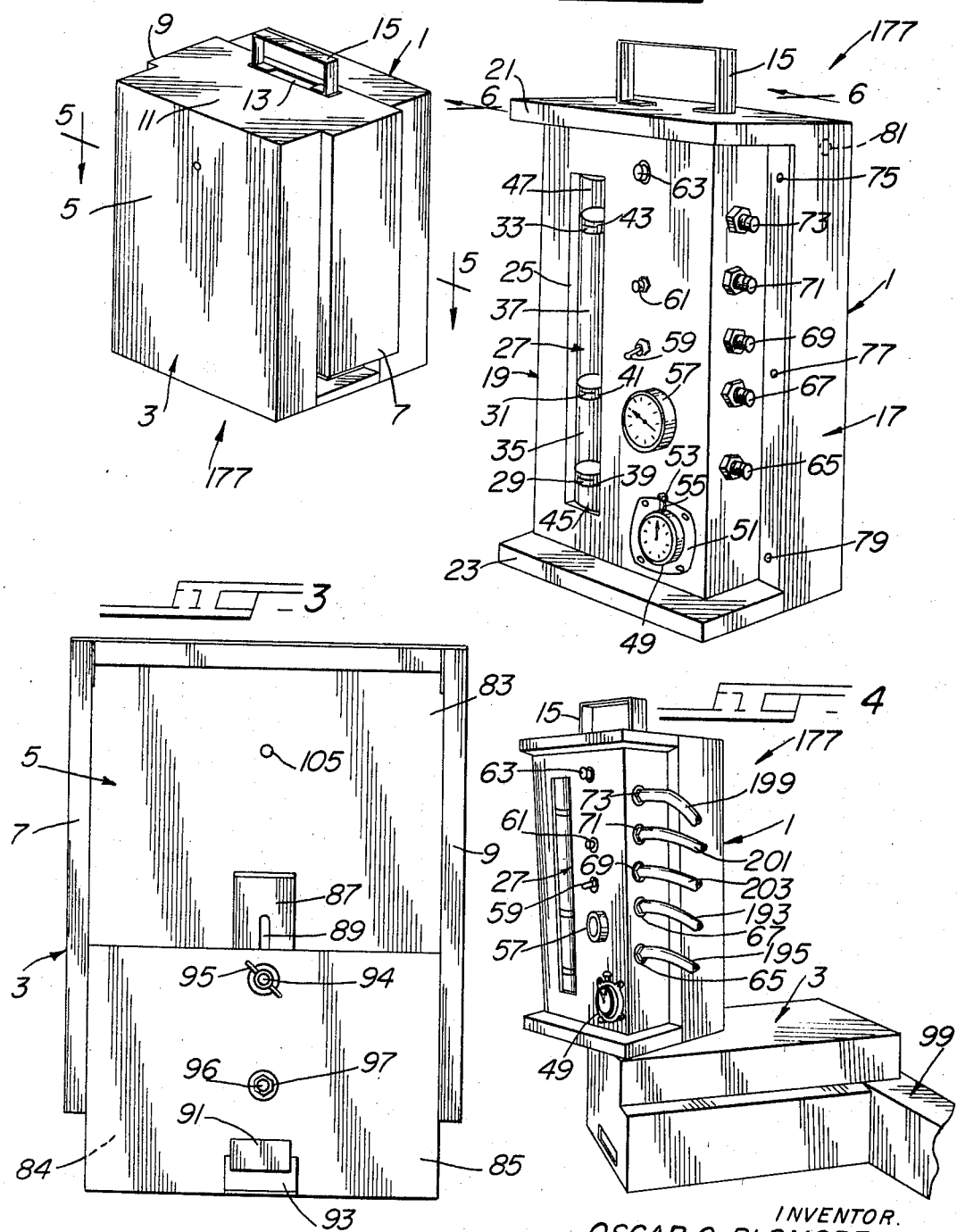

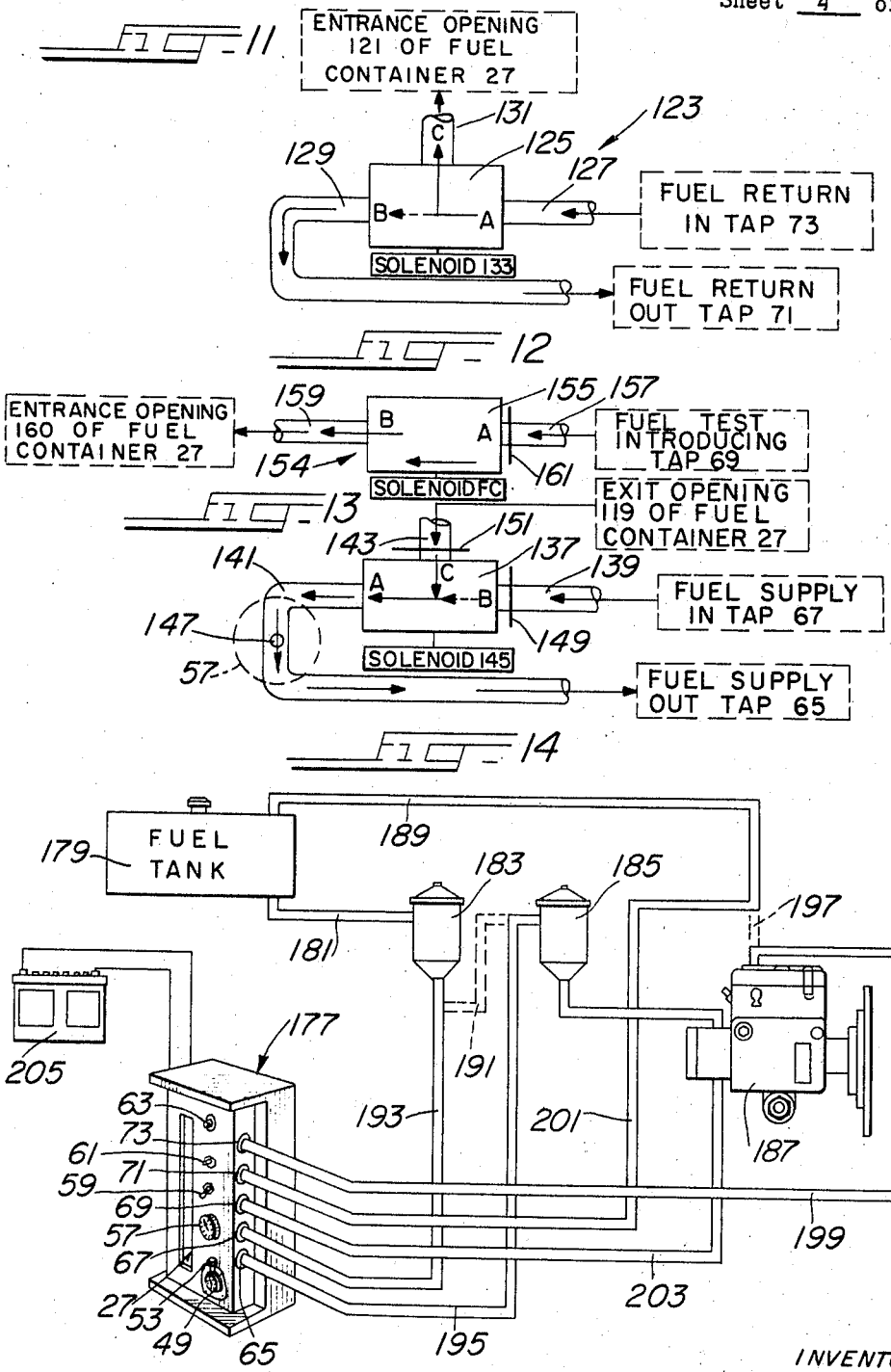

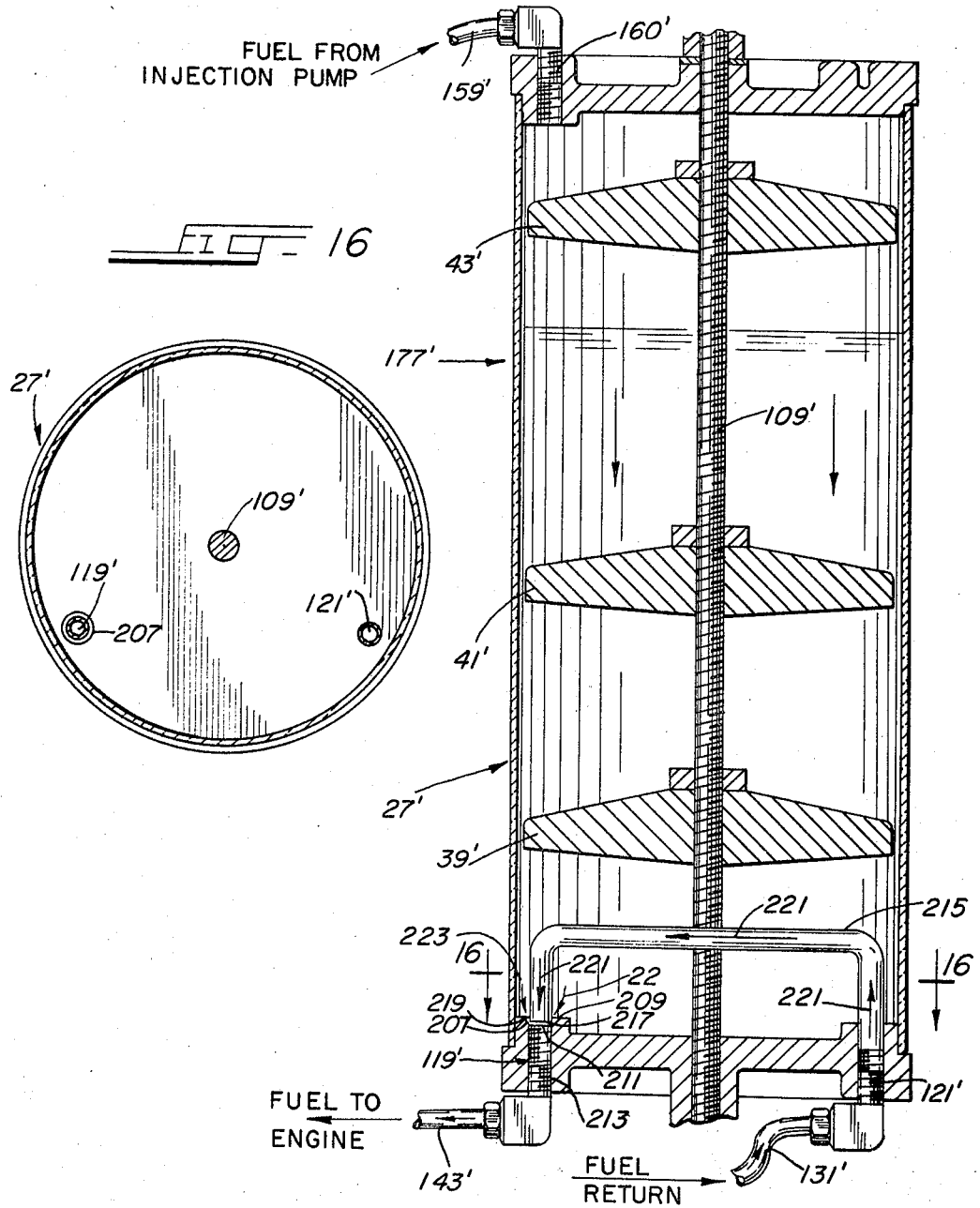

United States Patent Office 3,423,998
Patented Jan. 28, 1969

3,423,998
FUEL CONSUMPTION RATE MEASUREMENT FOR DIESEL ENGINES
Oscar C. Blomgren, Jr., Lake Bluff, Ill., assignor to Tuxco Corporation, North Chicago, Ill., a corporation of Illinois
Continuation-in-part of application Ser. No. 540,062, Apr. 4, 1966. This application Feb. 16, 1967, Ser. No. 643,751
U.S. Cl. 73—113         14 Claims
Int. Cl. G01l 3/26

ABSTRACT OF THE DISCLOSURE

Fuel consumption rate measuring apparatus utilizing a specially constructed and calibrated auxiliary fuel container and solenoid operated valves to substitute fuel input from the auxiliary container to a diesel engine for fuel input from a conventional fuel tank, thus providing for measurement of the time required for the diesel engine to consume a metered amount of fuel in the auxiliary fuel container without disrupting normal operation of the engine. A cover and housing assembly for the apparatus may be converted into a mounting support for the apparatus when it is used to measure the fuel consumption rate of diesel powered tractors and others vehicles.

*Cross reference to related application*

This application is a continuation-in-part of co-pending application entitled Fuel Consumption Rate Measurement for Diesel Engines, Ser. No. 540,062, filed Apr. 4 1966, and now abandoned.

*Brief summary*

In the typical operation of a diesel engine, it is of course desirable to obtain the largest possible power output per unit of fuel consumed. However, to obtain maximized power output, the natural tendency is to increase the fuel input to the engine to the greatest extent possible. This procedure, which results in overfueling, may not only decrease the efficiency of the diesel engine, but also may precipitate damage to the diesel engine itself. Damage to the diesel engine is occasioned by the undesirable conditions resulting from excessive engine heat, excessive engine speed, and excessive fuel firing pressures produced by overfueling. These undesirable conditions can result in damage to the pistons, the valves, the cooling system, the nozzle, and the head or head gaskets. In the case of a turbo-charged diesel engine, there is an even greater problem, since overfueling will produce an overpower condition that may damage the engine and the power train, and the turbo-charger itself may be damaged by overspeeding and overheating. Therefore, it is extremely critical to minimize or eliminate overfueling in a diesel engine, especially one of the turbo-charged type.

Since the consequences of overfueling a diesel engine may be drastic, it is desirable to have some means for accurately determining the proper setting of an injection pump in order to obtain maximum power output without overfueling. In the case of a naturally aspirated diesel engine (i.e., a diesel engine not provided with a turbo-charger), adjustments of the injection pump may be achieved by observing the exhaust smoke of the engine. However, this technique is highly inaccurate and usually results in injection pump adjustments that leave the fuel injection rate to the engine far from the optimum setting. Moreover, with the advent of turbo-charged engines, the adjustment of fuel consumption by observing an engine's exhaust smoke has been rendered obsolete. The present invention was evolved to obviate the risks of motor damage from overfueling by providing a method for determining the fuel consumption rate, in order to accurately adjust the injection pump.

Briefly, in the preferred embodiments described herein, the fuel consumption measuring device of the present invention provides a method of determining the rate at which fuel is consumed by an engine. A system comprising a fuel tank and an injection means (which in the case of a conventional diesel engine would be an injection pump) is described herein for purposes of illustration in association with an exemplary measuring device produced in accordance with the subject invention. A fuel supply line connects the fuel tank and the injection means through a filter arrangement. A fuel return line extends from the injection means back to the fuel tank in order to recirculate unused fuel to the tank for subsequent use.

When preparing to use the measuring device of this invention, the fuel supply line is in effect broken and then recompleted through fuel supply directing means (e.g., a solenoid controlled, three-way fuel supply valve) located in the measuring device, and operatively associated with first test control means (e.g., a solenoid). Likewise, the return line is in effect broken and recompleted through fuel return directing means (e.g., a solenoid controlled, three-way fuel return valve) located in the measuring device operatively associated with second test control means (e.g., a solenoid). A fuel test introducing line is extended from the injection means to a fill control means (e.g., a solenoid) operatively associated with fuel test introducing means (e.g., a solenoid controlled, two-way fuel introducing valve) located in the measuring device. By appropriate control of the first and second test control means and of the fuel test introducing means, the engine can continue to operate normally, except that the fuel in both the fuel supply line and the fuel return line would be by-passed through the respective directing means (e.g., appropriate valves) in the measuring device.

Another element of the measuring device is a fuel storage means (e.g., a cylindrical fuel container) provided with calibration means (e.g., marks on the container to define a portion thereof that will contain a specified quantity of fuel). More specifically, the calibration means further includes calibration discs on the inside of the container, with each disc placed adjacent one of the calibration marks. The calibration discs are tapered outwardly in a radial direction from the center, and the outer circumference of the discs is located a relatively short distance from the container wall. The calibration discs serve the functions of accurately calibrating the specified quantity of fuel that may be maintained between the calibration marks, and also of insuring that the flow of fuel past the calibration marks will be rapid enough to provide an accurate reading. Further, the calibration discs enable accurate readings even if the measuring device is not in a vertical position, or if the device is in motion. The measuring device also includes a time measuring means (e.g., a stop watch or electronic counter), a temperature measuring means (e.g., a thermosensitive gauge), and appropriate electrical control switches.

When it is desired to measure the fuel consumption rate of an engine, the engine can be run with the fuel flowing through the directing means in the measuring device until the fuel temperature is at the normal operating temperature, as determined by the temperature measuring means. At that time, the fill control means that control the actuation of the fuel test introducing means will be temporarily activated (e.g., by energization of the fill control solenoid in the particular embodiment described herein) in order to fill the fuel storage means with fuel. Subsequently, the first and second test control means can be activated (e.g., by de-energization of the fuel supply and fuel return control solenoids in the particular embodiment described herein). This will cause actuation of the fuel supply valve to block the flow of fuel from the fuel tank and to connect the fuel container to the fuel supply line, so that fuel for the injection means (and the engine) will be obtained from the container. Also, the fuel return valve will be actuated to cause the fuel being returned from the injection means to be deposited in the fuel container, rather than being returned to the fuel tank. By then measuring the time which it takes for the engine to consume the specified quantity of fuel between the calibration marks, an accurate determination of the fuel consumption rate of the engine may be achieved.

In a particular embodiment, the fuel consumption measuring device is adapted to be utilized with an engine having a high rate of fuel return flow. Normally the fuel return flow is to the top of the measuring device. However, if the rate of return fuel flow is high, introduction of this return fuel flow at the top of the device may cause foaming and a consequent reduction in accuracy of the device. To eliminate this problem, a conveyance means is utilized to transport the returned fuel directly to a fuel supply opening at the bottom of the measuring device. Thus, the returned fuel is introduced directly into the fuel supply flow to the injection means and disturbance of the fuel in the measuring device is minimized.

Another aspect of the measuring device of this invention is its particular adaptability for use in conjunction with diesel powered tractors (and other diesel powered vehicles, although this description is primarily directed to the tractor embodiment). In order to make its use in this environment more convenient, a cover for the measuring device is constructed to be fastened to a channel type of side rail found on most tractors (although, of course, it may be used to mount the device on any channel type of support). The cover is normally fastened to a housing, which encloses the measuring device, in order to cover and protect a portion of the housing containing destructible elements. In addition, a carrying compartment is formed in the cover to provide a storage and transportation facility for various materials useful in the measuring process. When removed from the housing, the cover may be attached to a channel member at one end thereof to form a cantilever type of mounting for the housing. The housing is then pivotally connected to the other end of the cover, and the measuring device is securely mounted conveniently close to the fuel lines of the tractor.

Accordingly, it is a primary object of this invention to provide means for measuring the rate of fuel consumption in an engine, particularly a turbo-charged diesel engine.

A further object of this invention is to provide means for accurately measuring the rate of fuel consumption in a diesel engine that has a high rate of fuel flow to the fuel injection nozzles.

Still a further object of this invention is to maximize the power output of an engine while at the same time preventing overfueling and consequent damage to the engine, and, in the case of a turbo-charged diesel engine, damage to the turbo-charger.

Another object of this invention is to prevent any waste of fuel resulting from the introduction of more fuel than an engine can efficiently consume.

Still another object of this invention is to provide a device to aid in the accurate adjustment of an injection pump for a diesel engine for optimal efficient operation thereof.

Yet another object of this invention is to provide a unique cover and housing assembly that can double as a mounting support and that is especially advantageous in association with a fuel consumption measuring device especially when said device is used with conventional diesel powered tractors.

These and other objects, advantages, and features of the subject invention will hereinafter appear, and, for purposes of illustration, but not of limitation, exemplary embodiments of the subject invention are shown in the appended drawings in which:

*Drawings*

FIGURE 1 is a perspective view of the measuring device of this invention enclosed in its cover;

FIGURE 2 is an enlarged perspective view of the housing for the measuring device of this invention, with the outer cover removed;

FIGURE 3 is an enlarged back plan view of the cover utilized in conjunction with the subject invention;

FIGURE 4 is a perspective view of the measuring device shown in FIGURE 2 when mounted on the cover shown in FIGURE 3;

FIGURE 5 is a top plan view of the housing of the measuring device of this invention, with the cover shown in sectional view along the line 5—5 of FIGURE 1;

FIGURE 6 is a side sectional view taken along the line 6—6 of FIGURE 2;

FIGURE 7 is a plan sectional view taken along the line 7—7 of FIGURE 6;

FIGURE 8 is a plan sectional view taken along the line 8—8 of FIGURE 6;

FIGURE 9 is a plan sectional view taken along the line 9—9 of FIGURE 6;

FIGURE 10 is a schematic sectional view illustrating the connection of the cover of the measuring device of the subject invention to a channel type beam member;

FIGURE 11 is a schematic illustration of a first three-way valve utilized in the subject invention;

FIGURE 12 is a schematic illustration of a two-way valve utilized in the subject invention;

FIGURE 13 is a schematic illustration of a second three-way valve utilized in the subject invention;

FIGURE 14 is a schematic fluid flow circuit diagram, illustrating a measuring device of the subject invention connected to a particuar engine fuel supply system;

FIGURE 15 is a sectional view similar to FIGURE 6, but viewed from the opposite direction with the housing not shown, of another embodiment of the measuring device of this invention; and FIGURE 16 is a plan sectional view taken along the line 16—16 of FIGURE 15.

*Detailed description*

With reference to FIGURE 1, the measuring device of this invention is shown in a covered form, prepared for transporting or storing. The complete measuring device 177 shown in FIGURE 1 includes a housing 1, which contains all the elements of the measuring device 177, and a cover, or casing 3. Cover 3 includes a portion 5 which protrudes away from the front of the housing 1, and side portions 7 and 9 which encompass a part of the housing 1. A top 11 of cover 3 is provided with an opening 13, through which a handle 15, affixed to housing 1, extends.

An enlarged view of the housing 1, with cover 3 removed, is illustrated in FIGURE 2. Housing 1 has a rear portion 17 and a smaller front portion 19, which is inset between a top section 21 and a bottom section 23, both of which protrude forward from near portion 17 and are segments thereof. Front portion 19 of housing 1 is provided with a rectangular opening 25 through which a fuel container 27 may be observed. Fuel container 27 is, in this particular embodiment, a transparent cylindrical housing formed from clear plastic or glass. Three calibration marks 29, 31, and 33 are scribed on the surface of the housing of fuel container 27. Calibration marks 29 and 31 define a portion 35 of container 27 which will hold a first specified quantity of fuel (e.g., one quart), while calibration marks 31 and 33 define a portion 37 of container 27 which will hold a second specified quantity of fuel (e.g., two quarts). Located inside container 27 adjacent each of the calibration marks 29, 31, and 33 are calibration discs 39, 41, and 43, respectively. Calibration discs 39, 41, and 43 serve to accurately delimit the amount of fuel that will fill chambers 35 and 37, and to provide a rapid flow of fuel past calibration marks 29, 31, and 33 to insure an accurate reading of the time at which the fuel level passes the marks, even though the measuring device is in motion or not in a vertical position. It should also be noted that exit and entrance chambers 45 and 47 are formed at the bottom and top of container 27 by calibration discs 39, and 43, respectively. The details of construction of calibration discs 39, 41, and 43, and the significance of chambers 35, 37, 45, and 47 is explained in more detail below.

A conventional stop-watch 49 is securely fastened to the lower right-hand corner of portion 19 of housing 1 by a mounting member 51. An actuating button 53 is connected to the operating portion of stop-watch 49 by a stem 55. Stop-watch 49 is a conventional type of stop-watch having a push to start-push to stop-push to reset sequence. Stop-watch 49 is designed to read minutes, seconds, and fifths of seconds.

A conventional temperature gauge 57 extends through the front of portion 19 in order to provide an indication of the temperature of the fuel in the fuel container 27. Temperature gauge 57 is calibrated in degrees Fahrenheit and is connected to a standard type of thermosensitive device located in a position to directly contact the fuel.

Also located on the front of portion 19 are a toggle switch 59, a push-button switch 61, and an indicating bulb 63. Switches 59 and 61 are arranged to control the operation of electrical solenoids that are utilized in the preferred embodiment of the subject invention described herein. The operation of the electrical solenoids and the function of switches 59 and 61 is described in detail below. Bulb 63 is lit when all of the electrical solenoids are operating properly and, thus, provides a simple indication of the operability of the solenoids.

Five taps 65, 67, 69, 71, and 73 are located on one side of portion 19, as shown in FIGURE 2, and these taps comprise conventional threaded male portions used in fluid connecting arrangements. The significance of these taps will become apparent from the following description, but for purposes of reference they may be identified as: fuel supply out tap 65, fuel supply in tap 67, fuel test introducing tap 69, fuel return out tap 71, and fuel return in tap 73. When the measuring device is not in use, the introduction of foreign material to the system may be prevented by merely placing a threaded cap on each of the taps.

All of the operating components of the measuring device, as well as the elements described above, are mounted in the front portion 19 of housing 1. Front portion 19 is normally securely fastened to back portion 17 of housing 1 by screws 75, 77, and 79 (see FIGURE 2) and their counterparts (not shown) on the other side of the casing. A vent (not shown) is placed in the back of portion 17 to provide for ventilation of the operating components, which of course is highly desirable in view of the volatile and flammable nature of the fuels normally introduced into the device 177. Electrical power for the electrical devices utilized in the device 177 is obtained via a conventional plug 81 located in back portion 17.

The cover 3 for the measuring device of the subject invention is shown in more detail in FIGURE 3. This view illustrates the inside of cover 3, as though one were looking from the back right in FIGURE 1 with the housing 1 removed. In this view, side portions 7 and 9, and a front wall 83 of front portion 5 are visible. A partition 85 is spaced from front wall 83 of front portion 5. The recess 84 between front wall 83 and partition 85 provides a convenient compartment in which to carry or store materials that will be needed during the measurement process, such as connecting hoses, electrical wiring equipment, etc. Carrying compartment 84 is more clearly illustrated in the partial sectional view of FIGURE 5.

Located on partition 85 is a locking clamp 87. Locking clamp 87 has a longitudinal slot 89, which permits clamp 87 to be moved in a longitudinal direction when not tightly secured to partition 85. A U-shaped end 91 of locking clamp 87 extends through an opening 93 in partition 85. This relationship of U-shaped end 91 and opening 93 is more readily apparent from the FIGURE 5 view. Locking clamp 87 is secured to partition 85 by a bolt 94 having a wing nut 95 and a bolt 96 having a hexagonal nut 97. Besides providing protection for front portion 19 of housing 1 while the instrument is not being used, and providing a carrying compartment 84 between partition 85 and front wall 83, cover 3 serves the additional purpose of providing a mounting base for housing 1 during the fuel consumption measurement process.

By reference to FIGURE 10, the manner in which cover 3 may be connected to a channel member 99 may be seen. First, wing nut 95 and hexagonal nut 97 would be loosened to permit the locking clamp 87 to be moved in a longitudinal direction. Then the U-shaped end 91 of locking clamp 87 may be placed over the free end of a side 101 of channel member 99. Locking clamp 87 may then be positioned so that side 101 of channel member 99 would be supporting partition 85, without interfering with the operation of hexagonal nut 97. Wing nut 95 and hexagonal nut 97 would then be tightened to secure cover 83 to channel member 99. This provides a cantilever support for housing 1, which is mounted on cover 3 with some degree of rotational freedom by inserting a wing stud 103 (FIGURE 10) through a hole 105 (FIGURE 3) in front wall 83 to be threaded in a threaded opening (not shown) in the bottom of housing 1. The completed cantilever mounting of housing 1 on cover 3 may be seen by reference to FIGURE 4. While channel member 99 has been described generally, it should be recognized that one of the more common uses of the fuel consumption measuring device 177 will be in connection with diesel powered tractors. (It is again emphasized that the measuring device of this invention is particularly useful when used in any type of diesel powered vehicle, and that the description in connection with a tractor is merely exemplary of this usefulness.) On such a tractor, channel member 99 will constitute a standard channel type of side rail. Therefore, the arrangement of the subject invention provides a compact unit which may be easily and quickly connected to a tractor for measurement of the fuel consumption rate of the tractor.

With reference to FIGURE 5, the sectional view of cover 3 in conjunction with the top plan view of housing 1 illustrates the relationship of the cover and the housing. It may be seen that opening 93 in partition 85 extends into the bottom 106 of front portion 5. Also shown is a head 107 of the bolt 96 to which hexagonal nut 97 is affixed. The manner in which cover 3 encases and protects the front portion 19 of housing 1, without requiring a covering for the complete housing, also is clarified by the FIGURE 5 view.

The details of construction of fuel container 27 are illustrated in the enlarged sectional view of FIGURE 6. It may be seen that the calibration discs 39, 41, and 43 are threadedly mounted on a threaded rod 109. At its lowermost end, threaded rod 109 fits into a bottoming hole 111 located in a bottom closure 113 of fuel container 27. Bottom closure 113 is securely fastened to the outer walls of container 27 to form a fluid tight seal. Bottom closure 113 is fastened to the housing of the device by bolt 114. At its uppermost end, threaded rod 109 is provided with a double nut arrangement 115 on the external side of a top closure 117 for fuel container 27. The double nut arrangement 115 permits threaded rod 109 to be clamped at the desired position by tightening both nuts. Since the inside diameter of container 27 cannot economically be held to close tolerances, the positions of discs 39, 41 and 43 are adjusted on rod 109 until chambers 35 and 37 will contain the proper amount of liquid. Top closure 117 is then placed on container 27 to seal the container and clamp rod 109 with double nut arrangement 115.

In this particular embodiment, the calibration discs 39, 41, and 43 are preferably formed of aluminum (although they may be made of other metals or plastic) and are each tapered outwardly in a radial direction on both the upper and lower sides thereof. As indicated in FIGURE 6, the slope of the tapering on the upper side of the discs is somewhat greater than the slope of the tapering of the lower sides. The advantage of tapering the upper side of the discs is that a rapid flow is achieved across this surface, with no puddles or vacuum spots being created. Tapering of the lower side of the discs eliminates air pockets and turbulence that otherwise would be created in the chambers below the discs.

It should be noted, however, that the tapering of the discs is not so great that the vertical thickness (FIGURE 6 orientation) of the discs is completely dissipated at the outer circumferences of the discs. In fact, at the outer circumferences of the discs, which in this embodiment is about sixty-thousands of an inch from the inner surface of shell of container 27, the discs 39, 41, and 43 are relatively thick (e.g., about .4 inch) to provide relatively long vertical gaps 118 having relatively narrow radial widths (e.g., about .060 inch). The gaps 118 are located between discs 39, 41, and 43 and calibration marks 29, 31, and 33, respectively. Gaps 118 contain very little fuel due to their small widths in comparison to their relatively long vertical lengths. Thus, as the fuel in container 27 is removed, the fuel in the gaps will be quickly drained. This means that the fuel level in the gaps will drop quickly, so that the exact moment at which the fuel level drops below a given calibration mark may be precisely determined, even though the measuring device is not level.

At the bottom right-hand corner in FIGURE 6, an exit opening 119 is shown leading to the chamber 45. Exit opening 119 is the point at which fuel is removed from fuel container 27. By providing chamber 45 below the test chambers 35 and 37, the turbulence created at the exit opening 119 is isolated and not transmitted to the test chambers 35 and 37. Similarly, fuel is supplied to the fuel container 27 through an entrance opening 121 shown at the upper right-hand corner in FIGURE 6. While not limited thereto, a preferred construction of opening 121 in this particular embodiment is to direct the incoming fluid against the internal wall of container 27, so that the fluid descends in a toroidal path rather than dropping directly onto calibration disc 43. This arrangement serves to decrease the amount of input turbulence caused by splashing of the entering fuel, as would occur if the fuel entered in a vertical stream. Turbulence is also reduced by proper formation of the diameter of entrance opening 121, as calculated from volumetric considerations. An air bleeder hole 122 is formed in top closure 117 to prevent air lock in container 27. By providing chamber 47 above test chambers 37 and 35, the same protection from output turbulence that is achieved by chamber 45 is achieved for input turbulence by chamber 47.

In FIGURE 7, a fuel return directing valve assembly 123 is illustrated. Fuel return directing valve assembly 123 comprises a valve 125 and valve lines 127, 129, and 131. Line 127 is connected to the fuel return in tap 73. Line 129 is connected to the fuel return out tap 71 (this connection is not shown as such in the drawings). Line 131 is connected to the fuel entrance opening 121 in the top closure 117 of fuel container 27. A test control solenoid 133 is suitably arranged to control the actuation of valve 125.

Valve 125 is a three-way valve, the operation of which is illustrated in FIGURE 11. In FIGURE 11, the three ports of valve 125 have been identified by letters A, B, and C. Line 127 is connected to port A, line 129 is connected to port B, and line 131 is connected to port C. During normal operation, the fuel flow is from the fuel return in tap 73, through line 127 to valve port A, through valve 125 to valve port B (dotted arrow), and from valve port B to line 129 and the fuel return out tap 71. When solenoid 133 is activated (de-energized), valve 125 is actuated to cause the flow of fuel to go to port C (solid arrow) rather than to port B, and the fuel then flows out port C to line 131 and into fuel container 27 through entrance opening 121 therein.

In FIGURE 8, a fuel supply directing valve assembly 135 is illustrated. Fuel supply directing valve assembly 135 includes a valve 137 and lines 139, 141, and 143. Line 139 is connected to fuel supply in tap 67, while line 141 is connected to fuel supply out tap 65 (this connection is not shown as such in the drawings). Line 143 is connected to the fuel exit opening 119 at the bottom of fuel container 27. A test control solenoid 145 is operatively connected to valve 137. The bottom closure 113 of fuel container 27 and the connection of line 143 to the exit opening 119 is more clearly illustrated in FIGURES 6 and 9.

The operation of valve 137 is slightly different from the operation of valve 125, as illustrated in the schematic drawing of valve 137 in FIGURE 13. Valve 137 is also a three-way valve having ports identified as A, B and C, as in the FIGURE 11 illustration of valve 125. During normal operation of the FIGURE 13 arrangement, the fuel flow is from the fuel supply in tap 67 through line 139 to port B, through valve 137 (dotted arrow) to port A, then through port A to line 141 and the fuel supply out tap 65. It should be noted that a temperature responsive device 147 is located in line 141 to determine the fuel temperature and cause it to be displayed on temperature gauge 57 (schematically illustrated in broken lines in FIGURE 13). When test control solenoid 145 is activated (de-energized), the fuel flow through port B is blocked, as indicated schematically by the line 149. At the same time, fuel flow through line 143 and port C is permitted by removing a blocking portion, indicated schematically by line 151. Thus, the fuel flow is from fuel container 27 through line 143 and port C to port A (solid arrow), then through port A to line 141 and the fuel supply out tap 65.

In FIGURE 12, the operation of a fuel introducing valve assembly 154 (not otherwise shown in the drawings) is schematically illustrated. Valve assembly 154 comprises a valve 155 similar to valves 125 and 135, except that valve 155 is only a two-way valve, rather than a three-way valve. Thus, valve 155 performs only an on-off function. Valve 155 is connected between a line 157 and a line 159 and is controlled by a fill control solenoid FC. Line 157 is connected to fuel introducing tap 69, while line 159 (shown in FIGURE 7) is connected to a second entrance opening 160 in the top closure 117 of fuel container 27. As explained in conjunction with the description of entrance opening 121, a preferred construction of opening 160 is such as to direct the incoming fuel against the side of container 27. Also as explained in connection with opening 121, the opening 160 has a diameter calculated to reduce the turbulence. During normal operation, the fuel input to port A of valve 155 is blocked, as indicated schematically by line 161 in FIGURE 12. When associated fill control solenoid FC is activated (energized), fuel flow is permitted through valve port A, through valve 155 to valve port B, from port B to line 159, and thence into the top of fuel container 27 via entrance opening 160 therein.

In FIGURE 7, electrical leads 163 and 165 are shown connected to plug 81, and leads 167 and 169 are shown connected to bulb 63. Similarly, in FIGURE 8, electrical leads 171, 173, and 175 are shown connected to toggle switch 59. As the electrical connections involved in the measuring device of this invention are of a conventional type, they are not illustrated in detail. However, for purposes of clarity, the electrical circuits utilized will be briefly described. Lines 163 and 165 from plug 81 provide the power for bulb 63, test control solenoids 133 and 145, and the fill control solenoid FC that operates valve 155. The power for test control solenoids 133 and 145 is controlled by toggle switch 59, while the power to the fill control solenoid FC is controlled by push-button 61. When the toggle switch 59 is in a "down" (FIGURE 2 orientation) or "warm-up" position, the test control solenoids are energized from plug 81. Similarly, when push-button 61 is in its normal "out" position, the fill control solenoid FC is de-energized. Pressing push-button 61 to its "in" position will cause the fill control solenoid to be energized, while placing toggle switch 59 in its "up" (FIGURE 2 orientation) or "test" position will cause the solenoids to be de-energized. When push-button 61 is in its normal "out" position and toggle switch 59 is in its "down" position, bulb 63 will be in series with all three of the solenoids. Thus, bulb 63 will be lit unless there is an electrical discontinuity in the solenoid circuits. In this manner, bulb 63 indicates whether the electrical circuit is properly completed before the test or measurement is begun.

The operation of the fuel consumption measuring device 177 may be explained by reference to the FIGURE 14 diagram, which schematically shows the fuel consumption measuring device 177 connected to the fuel supply system of an engine. While not limited thereto, for purposes of this discussion, it will be assumed that the arrangement illustrated is a diesel fuel supply system for a diesel powered tractor. A fuel tank 179 provides fuel through a fuel supply line 181, containing conventional filters 183 and 185 in series, to a fuel injection means 187. In this particular embodiment, the fuel injection means 187 is an injection pump. The unused fuel from the injection pump 187 (i.e., that not injected into the engine for combustion, by conventional means, not shown) is returned to fuel tank 179 through a fuel return line 189. When it is desired to connect the fuel consumption rate measuring device 177 into the fuel supply system, the fuel supply line 181 is in effect broken at some point, preferably in between the filters 183, 185, as illustrated by the dotted line 191. The portion of fuel supply line 181 on the side of the break toward the fuel tank is connected to fuel supply in tap 67 by a hose 193. Similarly, the portion of fuel supply line 181 on the side of the break toward the injection pump 187 will be connected to fuel supply out tap 65 through a hose 195. The break may be made anywhere in the fuel supply line 181 but is preferably between two filters in the line, so that the fuel entering and leaving the measuring device will be filtered.

In the same manner that fuel supply line 181 is broken, fuel return line 189 is broken at a point such as that represented by dotted line 197. The portion of the return line 189 on the side of the break toward the injection pump 187 is connected to the fuel return in tap 73 by a hose 199. Similarly, the portion of the fuel return line 189 on the side of the break toward the fuel tank 179 is connected to the fuel return out tap 71 by a hose 201.

Another hose 203 is connected from fuel injection pump 187 to fuel introducing tap 69. Hose 203 is connected to injection pump 187 adjacent the fuel input to the injection pump, as shown in FIGURE 14.

To aid the operator of the device, hoses 193, 195, 199, 201, and 203 may be color coded (e.g., by differing colors for the respective hoses, by coloring stripes or other markings thereon, etc.). Thus, each of the hoses could have a particular identifying color that would be so indicated in the instruction manual or on housing 1 of the instrument itself. Such an arrangement would facilitate the process of connecting a measuring device 177 into a fuel supply system.

In this particular embodiment, electrical power for the electrical system in the measuring device is obtained from the tractor battery 205 through plug 81. Of course, it should be realized that the electrical power may also be obtained from any other suitable power output, such as a self-contained battery provided with the measuring device.

When the rate of fuel consumption is to be measured, the engine must be properly loaded and the motor speed determined to a high degree of accuracy, if the test results are to be at all meaningful. While a standard dynamometer is sufficient for measuring the load, the standard tachometer on the tractor, or on the dynamometer, is not sufficiently accurate for measuring engine speed for this test. Some relatively precise instrument, such as a photocell tachometer, should be utilized for determining the speed of the engine.

To begin the measuring operation, electrical power is supplied to measuring device 177, and toggle switch 59 is placed in the "warm-up" position (down in the FIGURE 14 orientation). With toggle switch 59 in this position, the test control solenoids 133, 145 are energized and fill control solenoid FC is de-energized, and appropriate circuitry means (not shown) then cause the circuit for the bulb 63 to be completed. Thus, if there are no breaks or discontinuities in the electrical circuit, bulb 63 will light to indicate proper electrical operation of the measuring device. With all three of the solenoids in the indicated states of energization, fuel supply line 181 will be completed through the fuel supply directing valve assembly 135, and fuel return line 189 will be completed through the fuel return directing valve assembly 123, so that the engine will operate as normal.

When it is now desired to test, or measure, the fuel consumption rate of the engine, push-button 61 is depressed in order to activate (i.e., energize) fill control solenoid FC and thereby to actuate fuel introducing valve assembly 154 (shown in FIGURE 12) to permit fuel to be introduced into fuel container 27 from injection pump 187, through fuel test introducing line 203, fuel test introducing tap 69, valve assembly 154, hose 159, and entrance opening 160. The fuel to be used in the measurements should be at the proper temperature, as indicated by temperature gauge 57. Enough fuel is introduced through fuel introducing valve assembly 154 to fill fuel container 27 above the calibration mark indicating the top of the specified quantity of fuel to be used, and push-button 61 is then released to de-activate (i.e., de-energize) fill control solenoid FC and thus to stop the filling of fuel into fuel container 27. To then measure the fuel consumption rate, toggle switch 59 is thrown to the "test" position (up in the FIGURE 14 orientation). When toggle switch 59 is put in the "test" position, both of the test control solenoids 133, 145 will be activated (i.e., de-energized). This means that hose 193 will be blocked, so that all of the fuel going to fuel injection pump 187 will come from fuel container 27 through exit opening 119, hose 143, valve assembly 135, fuel supply out tap 65, and hose 195. Also, hose 201 to the fuel tank will be blocked, so that the fuel returning from the injection pump will be returned to fuel container 27 via hose 199, fuel return in tap 73, valve assembly 123, hose 131, and entrance opening 121.

By this arrangement the fuel tank 179 is removed from the fluid circuit, and pump 187 will act to recirculate the fuel stored in fuel container 27, less any amounts thereof consumed by actual injection operation of the pump 187 into the engine. In other words, pump 187 will draw off a certain amount of fuel from container 27 and will return a lesser amount as recirculated (i.e., non-consumed) fuel. The visible fluid level within container 27 is then a direct function of the amount of fuel consumed (i.e., non-recirculated) since the fluid level represents the net effect of fuel removal and replenishment by recirculation within container 27.

When the fuel level in fuel container 27 falls below the top calibration mark defining a specified quantity of fuel, the button 53 of stop-watch 49 is depressed. Since the calibration discs are uniquely arranged to guarantee a rapid flow of fuel past the calibration marks, it is possible to accurately denote the time at which the fuel level falls below the desired calibration mark. After the engine has used enough fuel to cause the fuel level in the fuel container to fall below a succeeding or lower calibration mark, the button 53 of stop-watch 49 is again depressed. Toggle switch 59 is then placed in the "warm-up" (down) position again, and the system reverts to normal operation until another test is desired or until the device 177 is disassociated from the engine. Since the quantity of fuel that has been consumed is known very accurately (i.e., the differential calibrated volume) and since the time it took to consume that amount of fuel is precisely indicated by the stop-watch, the rate of fuel consumption may be determined with a large degree of accuracy.

The fuel consumption measuring device 177 herein described provides an extremely accurate measurement of the rate of fuel consumption, especially when utilized with an engine having a low rate of return fuel flow. In some environments, though, use is made of diesel engines in which the injection pump 187 pumps fuel at a rapid rate to injection nozzles which introduce the fuel into a combustion chamber. With the introduction of more fuel into the combustion chamber, less fuel is burned and the rate of return fuel is greater. A greater flow of returned fuel in the entrance opening 121 at the top of fuel container 27 will cause foaming in container 27 and may lead to inaccuracies in the measurement, due to the difficulty of determining the exact fuel level. Therefore, the embodiment of the fuel consumption measuring device shown in FIGURES 15 and 16 has particular utility in a diesel engine that utilizes a high rate of fuel flow to the injection means.

To simplify the description of the FIGURES 15 and 16 embodiment, parts in this embodiment corresponding to parts of the FIGURES 1—14 embodiment have been indicated by primed numerals, corresponding to the numerals of the FIGURES 1-14 embodiment. FIGURE 15 illustrates a section of a fuel consumption measuring device 177', with housing 1 not being shown. Measuring device 177' has a fuel container 27', a fuel entrance opening 160', calibration discs 39', 41', and 43', and an exit opening 119'.

Exit opening 119' has been provided with an inverted frusto-conical mouth 207. Base 209 of the frusto-conical mouth 207 opens to the interior of the fuel container 27', while truncated apex 211 of frusto-conical mouth 207 mates with main portion 213 of exit opening 119'. The end of exit opening 119' away from frusto-conical mouth 207 is connected to a fuel supply valve (such as valve 137 in FIGURE 13) by a hose 143'.

Also located in the bottom of fuel container 27' is an entrance opening 121' for unconsumed fuel being returned from the engine. In the FIGURES 1–14 embodiment the corresponding entrance opening 121 is at the top of the fuel container 27. Returned fuel is conveyed to entrance opening 121' by a hose 131' from a fuel return value (such as valve 125 in FIGURE 11). From entrance 121' the returned fuel is conveyed through a conduit 215, which may be a hose or pipe, to the frusto-conical mouth 207. Conduit 215 has an end 217 positioned in the frusto-conical mouth 207, but above the truncated apex 211. Since conduit 215 is approximately the same diameter as exit opening 119', a small opening 219 is left between the conduit 215 and the frusto-conical mouth 207.

During operation of the measuring device 177', the returned fuel flows through entrance opening 121' and conduit 215 to exit opening 119' as indicated by arrows 221. Thus, the returned fuel is transferred directly to the exit opening 119' without causing a disturbance or "foaming" in the fuel container 27'. The return fuel flow into exit opening 119' is accompanied by a flow of fuel from container 27, as indicated by arrows 223. In this manner the desired flow of fuel to the injection pump is maintained while the fuel in the container 27' is subjected to a minimal disturbance from fuel return flow.

It should be understood that the embodiments described herein are merely exemplary of the preferred practices of the present invention and that various changes, modifications, and variations may be made in the arrangements, operations, and details of construction of the elements disclosed herein, without departing from the spirit and the scope of the present invention, as defined in the appended claims.

What is claimed is:

1. Fuel consumption rate measuring apparatus of the character described adapted for use in association with an engine having a fuel tank, a fuel supply line connected from the fuel tank to a fuel injection means, and a return line connected from the fuel injection means to the fuel tank to recirculate unused fuel to the fuel tank, and comprising:

fuel storage means;

calibration means adapted to accurately delimit a specified quantity of fuel in said fuel storage means;

test control means;

fuel supply directing means having a three-way fuel supply valve connected in the fuel supply line and normally completing a fluid path from the fuel tank to the fuel injection means, activation of said test control means actuating said fuel supply valve to block the flow of fuel from the fuel tank and to cause a flow of fuel from said fuel storage means to the fuel injection means;

fuel return directing means having a three-way fuel return valve connected in the return line and normally completing a fluid path from the fuel injection means to the fuel tank, activation of said test control means actuating said fuel control valve to block the flow of fuel to the fuel tank and to cause a flow of fuel from the fuel injection means to said fuel storage means;

a fuel test introducing line connected from the fuel injection means to said fuel storage means;

fill control means;

fuel test introducing means having a two-way fuel test introducing valve normally blocking said fuel test introducing line, activation of said fill control means actuating said fuel test introducing valve to open said fuel test introducing line and time measuring means, whereby the fuel consumption rate of the engine for a particular state of engine operating conditions may be accurately ascertained by activating said test control means and using said time measuring means to determine the time required to consume said specified quantity of fuel.

2. Apparatus as claimed in claim 1 wherein:

said test control means comprises a solenoid for operating said fuel supply valve and a solenoid for operating said fuel return valve;

said fill control means comprises a solenoid for operating said fuel test introducing valve;

a temperature gauge is provided to measure the temperature of the fuel in said fuel storage means; and said time measuring device comprises a manually operable stop-watch for accurately measuring the time required to consume said specified quantity of fuel.

3. An apparatus as claimed in claim 1 and further comprising:

a generally rectangular housing essentially enclosing said apparatus and having an outer surface including a portion thereof requiring protection;

a removable cover to shield at least said portion of said outer surface of said housing and having a main front portion, a pair of side portions, and a top portion;

an opening formed in said top portion through which a handle in said housing may extend to provide a locking connection between said housing and said cover;

a carrying compartment formed in said main front portion by a front wall thereof and a partition spaced from said front wall at the bottom of said main front portion;

a locking clamp releasably secured to said partition and including a U-shaped end to hook over a channel member, so that said clamp may be released and resecured to connect said cover to said channel member; and an opening formed on the top end of said front wall to receive a mounting stud for said housing.

4. Fuel consumption rate measuring apparatus of the character described adapted for use in association with an engine having a fuel tank, a fuel supply line connected from the fuel tank to a fuel injection means, a high rate of fuel flow to the injection means, and a return line connected from the fuel injection means to the fuel tank to recirculate unused fuel to the fuel tank, and comprising:

fuel storage means;

calibration means adapted to accurately delimit a specified quantity of fuel in said fuel storage means;

fuel supply directing means arranged when actuated to block the flow of fuel from the fuel tank to the fuel injection means and to provide a flow of fuel from said fuel storage means to the fuel injection means;

fuel return directing means arranged when actuated to block the flow of unused fuel from the fuel injection block the flow of fuel from the fuel tank to the fuel to be returned from the fuel injection means to said fuel storage means;

conveyance means associated with said fuel return directing means to return the unused fuel directly to said fuel supply directing means;

fuel test introducing means arranged when actuated to provide at least said specified quantity of fuel within said fuel storage means;

fill control means for actuating said fuel test introducing means;

test control means for actuating said fuel supply directing means and said fuel return directing means; and time measuring means, whereby the fuel consumption rate of the high rate of fuel injection engine may be accurately ascertained for a particular state of engine operating conditions by activating said fill control means and said test control means and using said time measuring means to determine the time required to consume said specified quantity of fuel.

5. Apparatus as claimed in claim 4 wherein said fuel storage means comprises:

a transport housing having a bottom side;

an exit opening having an inverted frusto-conical mouth formed in said bottom side; and a fuel return entrance opening in said bottom side.

6. Apparatus as claimed in claim 5 wherein said conveyance means comprises:

a hose connected from said fuel return directing means to said entrance opening; and a conduit located in said fuel storage means and connected from said fuel return entrance opening to the frusto-conical mouth of said exit opening.

7. Apparatus as claimed in claim 6 wherein:

said fuel supply directing means comprises a three-way fuel supply valve connected in the fuel supply line and normally completing a fluid path from the fuel tank to the fuel injection means, activation of said test control means actuating said fuel supply valve to block the flow of fuel from the fuel tank and to cause a flow of fuel from said fuel storage means to the fuel injection means;

said fuel return directing means comprises a three-way fuel return valve connected in the return line and normally completing a fluid path from the fuel injection means to the fuel tank, activation of said test control means actuating said fuel return valve to block the flow of fuel to the fuel tank and to cause a flow of fuel from the fuel injection means to said fuel storage means;

said fuel test introducing means comprises a two-way test introducing valve normally blocking a fuel test introducing line from the fuel injection means to said fuel storage means;

said fuel test introducing means comprises a two-way test introducing valve normally blocking a fuel test introducing line from the fuel injection means to said fuel storage means, activation of said fill control means actuating said fuel test introducing valve to open said fuel test introducing line;

said test control means comprises a solenoid for operating said fuel supply valve and a solenoid for operating said fuel return valve;

said fill control means comprises a solenoid for operating said fuel test introducing valve; and said calibration means comprises marks placed on said transparent housing and a pair of tapered discs adjustably positioned vis-a-vis each other.

8. Fuel consumption rate measuring apparatus of the character described adapted for use in association with an engine having a fuel tank, a fuel supply line connected from the fuel tank to a fuel injection means, and a return line connected from the fuel injection means to the fuel tank to recirculate unused fuel to the fuel tank, and comprising:

fuel storage means having a transparent housing so that fuel therein may be seen from a point outside said housing;

calibration means comprising calibration marks placed on said housing to define a portion of said housing that will hold a specified quantity of fuel, and further comprising at least one calibration member adjustably positioned within said transparent housing to precisely establish the dimensions of said portion of the housing, said calibration member being positioned in relatively close proximity to one of said calibration marks to accurately indicate the precise level of fuel in said housing by causing a relatively high velocity of fuel flow past said calibration mark;

fuel supply directing means arranged when actuated to block the flow of fuel from the fuel tank to the fuel injection means and to provide a flow of fuel from said fuel storage means to the fuel injection means;

fuel return directing means arranged when actuated to block the flow of unused fuel from the fuel injection means to the fuel tank and to cause the unused fuel to be returned from the fuel injection means to said fuel storage means;

test control means for actuating said fuel supply directing means and said fuel return directing means; and time measuring means, whereby the fuel consumption rate of the engine for a particular state of engine operating conditions may be accurately ascertained by activating said test control means and using said time measuring means to determine the time required to consume said specified quantity of fuel.

9. Apparatus as claimed in claim 8 wherein said calibration member comprises a tapered disc.

10. Apparatus as claimed in claim 9 and comprising two such discs in association with respective calibration marks and adjustably positioned vis-a-vis each other.

11. Apparatus as claimed in claim 10 wherein said housing further comprises a portion adjacent each end thereof in order to isolate said specified quantity of fuel contained between said discs from disturbances occasioned by the removal of fuel and return of fuel to and from said transparent housing.

12. Apparatus as claimed in claim 9 and comprising three such discs in association with respective calibration marks and adjustably positioned vis-a-vis each other, so as to provide two calibrated portions in said housing, each calibrated portion holding a different specified quantity of fuel than the other.

13. Fuel consumption rate measuring apparatus of the character described adapted for use in association with a diesel powered tractor having a fuel tank, a fuel supply line connected from the fuel tank to a fuel injection pump, and a return line connected from the fuel injection pump to the fuel tank to recirculate unused fuel to the fuel tank, and comprising:
- a generally rectangular housing in which the elements of the measuring apparatus are mounted and which has a fuel supply in tap, a fuel supply out tap, a fuel return in tap, a fuel return out tap, and a fuel test introducing tap;
- a fuel supply in hose connected from said fuel supply in tap to the fuel tank side of the fuel supply line;
- a fuel supply out hose connected from said fuel supply out tap to the fuel injection pump side of the fuel supply line;
- a fuel return in hose connected from said fuel return in tap to the injection pump side of the fuel return line;
- a fuel return out hose connected from said fuel return out tap to the fuel tank side of the fuel return line;
- a fuel test introducing line having a hose connected from the injection pump to said fuel test introducing tap;
- fuel storage means having a transparent housing so that fuel therein may be seen from a point outside the housing;
- calibration means comprising calibration marks placed on said transparent housing to define a portion of said housing that will hold a specified quantity of fuel, and further comprising at least one tapered calibration disc located within said transparent housing adjacent one of said calibration marks;
- fuel supply directing means having a three-way fuel supply valve with ports connected to said fuel supply in tap, said fuel supply out tap, and said fuel storage means and arranged when actuated to block the flow of fuel from the fuel tank to the fuel injection pump and to provide a flow of fuel from said fuel storage means to the fuel injection pump;
- fuel return directing means having a three-way fuel return valve with ports connected to said fuel return in tap, said fuel return out tap, and said fuel storage means and arranged when actuated to block the flow of unused fuel from the fuel injection pump to the fuel tank and to cause the unused fuel to be returned from the fuel injection pump to said fuel storage means;
- test control means having a solenoid for operating said fuel supply valve and a solenoid for operating said fuel return valve;
- fuel test introducing means having a two-way fuel test introducing valve with ports connected to said fuel test introducing tap and said fuel storage means and arranged when actuated to provide at least said specified quantity of fuel within said fuel storage means;
- fuel control means having a solenoid for operating said fuel test introducing valve;
- a time measuring device comprising a manually operable stop watch for accurately measuring the time required to consume said specified quantity of fuel; and
- a temperature gauge to measure the temperature of the fuel in said transparent housing,
- whereby the fuel consumption rate of the diesel powered tractor for a particular state of operating conditions may be accurately ascertained by activating said test control means and using said time measuring means to determine the time required to consume said specified quantity of fuel.

14. Apparatus as claimed in claim 13 wherein said hoses are coded to provide for easy and accurate completion of the necessary connections.

References Cited

UNITED STATES PATENTS

| | | |
|---|---|---|
| 1,611,017 | 12/1926 | Fuller. |
| 2,855,257 | 10/1958 | Barker et al. _____ 73—431 X |
| 2,876,639 | 3/1959 | Loizzo et al. _____ 73—113 |
| 2,924,495 | 2/1960 | Haines _____ 73—431 X |
| 2,966,257 | 12/1960 | Littlejohn. |

OTHER REFERENCES

Judge, A. W., The Testing of High Speed Internal Combuston Engines, fourth ed. revised, London, 1955, pages 88 and 89.

RICHARD C. QUEISSER, *Primary Examiner.*

JERRY W. MYRACLE, *Assistant Examiner.*

U.S. Cl. X.R.

73—119